Oct. 12, 1926.
H. R. SWANSON
MATTRESS FILLING MACHINE
Filed July 18, 1925
1,602,465
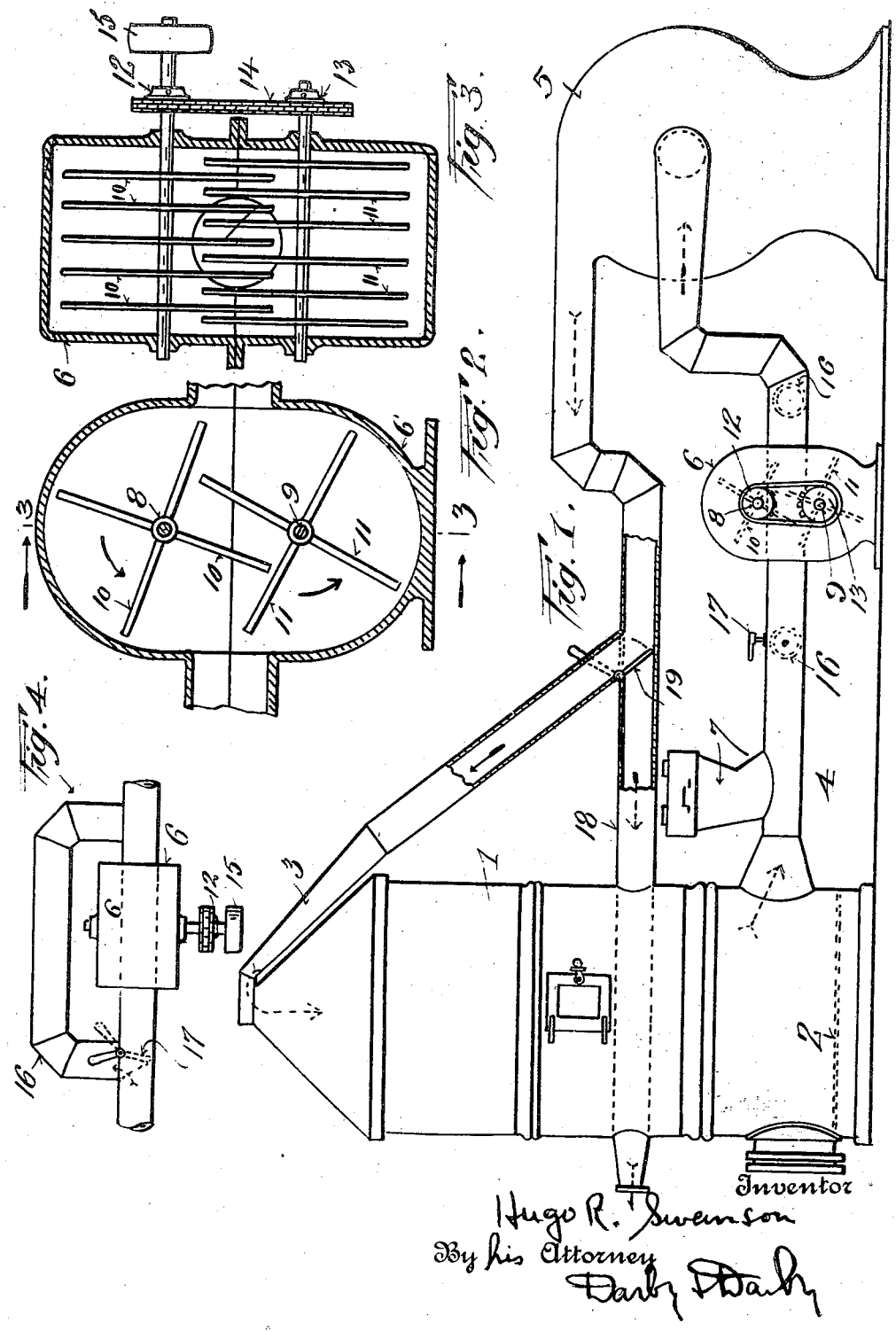
Inventor
Hugo R. Swanson
By his Attorney
Darby & Darby Patented Oct. 12, 1926.

1,602,465

UNITED STATES PATENT OFFICE.

HUGO R. SWANSON, OF BOSTON, MASSACHUSETTS, ASSIGNOR TO TRIANGLE KAPOK MACHINE CORP., OF NEW YORK, N. Y., A CORPORATION OF DELAWARE.

MATTRESS-FILLING MACHINE.

Application filed July 18, 1925. Serial No. 44,493.

This invention relates to mattress filling machines of the type shown in the prior patent to myself and Contrado & Schwartz, No. 1,370,411, on which the present invention is an improvement.

The objects of the invention are to provide a mattress filling machine which may be used with any of the well known mattress filling materials, such as cotton, down, kapok, and the like; to provide an improved picker for machines of this type; to provide a picker which may or may not be used according to the material operated upon; to avoid clogging of the materials in the picker; to avoid interference of the picker with the settling of foreign matter in the aeration and separation tank; to necessitate positive passage of the material through the picker when the same is used; to secure simplicity of construction and operation; and to obtain other advantages and results as may be brought out in the following description.

Referring to the accompanying drawings in which like numerals of reference indicate the same parts throughout the several views:

Figure 1 is a side elevation, partially diagrammatic, showing an apparatus embodying my invention;

Figure 2 is a sectional view of the picker, looking in the same direction as in Figure 1;

Figure 3 is a transverse section thereof on line 3—3 of Figure 2, and

Figure 4 is a plan of the picker and associated flues.

In the specific embodiment of the invention illustrated in said drawings the reference numeral 1 indicates an aeration tank or chamber of suitable size and shape and provided with a grate 2 at the bottom as commonly employed in the art. An inlet pipe 3 opens into the top of the tank and an outlet pipe 4 opens from the side of the tank just above the grate. Said inlet and outlet pipes are connected to opposite sides of a blower 5 by means of which a circulation of material may be had through the tank for aerating and cleaning the material as well as separation of foreign matter. Efficiency of my apparatus is greatly increased by arranging the inlet pipe at the top of the tank, giving the materials the advantage of the entire fall from top to bottom in which to aerate and to drop heavier foreign matter. Also, efficiency is increased by not mechanically picking or mixing the material while in the aeration tank, thus avoiding any tendency to disturb the natural separation of the heavier foreign matter or mix it in again so it would be caused to return into the circulation pipes with the desirable materials.

I do, however, employ a picker, and as an important part of the present invention have shown a picker 6 in the pipe line 4 between the bottom of the aeration tank and the blower. By this arrangement the picking of the material is not only done independent of the aeration in the tank, but assures all of the material necessarily passing through the picker. Furthermore, I employ a feeder 7 for introducing material into the system between the tank and the picker so that the material is picked, and not only fluffed so as not to clog the system but thereby prepared so as to pass through the system and brought to final usable condition in the least amount of time.

Said picker preferably includes a pair of parallel rotated shafts 8, 9, one of which, as 8, is rotated faster than the other. Both shafts have projecting tines 10, 11 respectively of such length and arrangement that the tines 10 of one shaft pass between the tines 11 of the other shaft. Rotation of the shafts may be in a direction so as to move the intermeshed tines in the direction of the passage of the material if desired in its passage through the picker or they may be rotated in opposite directions. Consequently the flow of material is not stopped by the picker, and since the tines are moving at different rates, the material will be picked as it passes through. It may also be noted that the inlet and outlet of the picker are in alignment with each other and with the intermeshing tines so there is no deviation of the material in its passage through the picker. As illustrative of driving means for the shafts, I have shown a small sprocket 12 on the faster moving shaft 8 and a larger sprocket 13 on the slower moving shaft 9 with a chain 14 over the sprockets and a driving pulley 15 on one of the shafts.

For purposes of eliminating the picker from operation upon such materials as kapok, down and so forth, which do not require picking, I provide a by-pass 16 around the picker. This by-pass branches off from the pipe 4 connecting the aeration tank with the picker and returns to the pipe leading from the picker to the blower. A suitable damper 17 is incorporated at the juncture in advance of the picker so as to direct the materials either through the picker or through the by-pass.

It will be understood that the material is rotated around and around in the system until its condition is satisfactory for use. To remove the material, a branch 18 is provided from the pipe 3 to the top of the tank, and a damper 19 is arranged to direct the material either to the top of the tank or out through said branch pipe 18.

Obviously detail changes and modifications may be made in manufacture and use of my improved machine, and I do not wish to be understood as limiting myself to the exact structure shown except as set forth in the following claims when construed in the light of the prior art.

Having thus described the invention, I claim:—

1. A machine of the character described, comprising a closed aeration tank, pipes leading into and out of said tank having circulating means associated therewith for removing material from said tank and returning said material to the tank, and revolving means exterior of the tank for operating upon the materials during transition from and back to the tank.

2. A machine of the character described, comprising an aeration tank, pipes leading into and out of said tank having circulating means associated therewith for removing material from said tank and returning said material to the tank, a picker exterior of the tank for operating upon the materials during transition from and back to the tank, and a by-pass around said picker.

3. A machine of the character described, comprising an aeration tank, pipes leading into and out of said tank having circulating means associated therewith for removing material from said tank and returning said material to the tank, and a picker exterior of the tank for operating upon the materials during transition from and back to the tank.

4. A machine of the character described, comprising an aeration tank, pipes leading into and out of said tank having circulating means associated therewith for removing material from said tank and returning said material to the tank, a picker exterior of the tank for operating upon the materials during transition from and back to the tank, a by-pass around said picker, and means for directing the material either through the picker or through the by-pass.

5. In a machine of the character described comprising in combination with means for circulating materials, a picker in the path of circulation, said picker having revolving tines some of which rotate at a greater rate of speed than others.

6. In a machine of the character described comprising in combination with means for circulating materials, a picker in the path of circulation, said picker having a pair of revolving shafts with projecting tines, the tines of one shaft passing between tines of the other shaft.

7. In a machine of the character described comprising in combination with means for criculating materials, a picker in the path of circulation, said picker having a pair of revolving shafts with projecting tines, the tines of one shaft passing between the tines of the other shaft, and means for revolving one of said shafts faster than the other.

In testimony whereof I have hereunto set my hand on this 6th day of July A. D., 1925.

HUGO R. SWANSON.